Patented Sept. 13, 1932

1,877,207

UNITED STATES PATENT OFFICE

DOUGLAS FRANK TWISS AND EDWARD ARTHUR MURPHY, OF BIRMINGHAM, ENGLAND, ASSIGNORS TO DUNLOP RUBBER COMPANY LIMITED, A BRITISH COMPANY

METHOD OF MAKING TUBULAR OBJECTS FROM RUBBER COMPOSITIONS

No Drawing. Application filed October 2, 1928, Serial No. 309,890, and in Great Britain October 5, 1927.

This invention relates to improvements in the production of tubing such as of rubber or similar material.

Heretofore rubber tubing has been made by wrapping a sheet or strip of unvulcanized rubber about a mandrel joining the abutting or overlapping edges to form a welded seam and then vulcanizing the tubular structure thus formed. Tubing made in this manner has the disadvantage that it is necessarily non-homogeneous throughout its circumference owing to the seam structure and that there is a weakness against circumferential stresses at the seam, particularly if, for any cause, the welding or joining of the abutting or overlapping edges should be imperfect. It has also been proposed to form a tubular object by forcing a suspension of rubber material through a nozzle, depositing the material on the inner surface of the nozzle and forcing the deposit to slide through the nozzle. This has the disadvantage that a deposit thus formed would be non-uniform. It also has all the difficulties and disadvantages attendant upon an effort to slide unvulcanized rubber on a surface.

In our invention the tubular object is formed by depositing rubber from a latex or dispersion on the outer surface of a tubular object in one or more deposits. When a layer of the desired thickness is formed it may be stripped from the former after being dried or vulcanized. For instance, a core of rubber or other suitable material, which may be flexible or rigid or hollow or solid is caused to pass through a bath containing a concentrated and/or compounded natural or artificial aqueous dispersion comprising rubber, gutta percha, balata or similar vegetable resins or a mixture of the same and containing, if desired, any of the usual compounding ingredients including vulcanizing agents. The dispersions may, if desired, be in vulcanized form. The aforesaid dispersions may contain as additions, dispersions of organic substances such as resins and cellulosic substances, or dispersions prepared from vulcanized rubber or waste rubber. Concentrates prepared as described in application Serial No. 232,705 are particularly suitable as the bath. Such concentrates contain the rubber dispersed throughout the dispersing liquid in a high concentration and stabilized therein by a stabilizing agent. Such dispersions, whether of natural or artificial origin, are generically termed hereinafter as dispersions of rubber material.

The core may be drawn through a body or bath of dispersion in a continuous manner. Preferably it is drawn through a tube of glass or similar material of the kind described in our co-pending application Serial No. 247,736, in which the core with its deposit of rubber latex leaves the surface of the dispersion centrally of a circular surface area.

To get the desired thickness of coating the core may be passed several times through the bath or the bath and the aforesaid tube, the previous deposit being dried or partly dried before each further coating.

If desired, the core, with its first coating, may be passed through a heated dehydrating and setting solution of, for instance, calcium chloride or ammonium acetate, to increase the setting of the deposit, and then if desired passed through the bath of the coating material again, the operations in the setting solution and the bath being repeated as often as desired. It is preferable to subject the core on leaving the setting solution to a washing with water before it is again passed through the bath.

The coating produced on the core is dried and, if desired, vulcanized. In the case where a hollow core is employed drying and vulcanizing may be aided by the external and/or internal application of heat. The heat is applied to the core immediately it leaves the bath or at the earliest possible moment.

The coating which is now the formed tube is then removed from the supporting core. This operation may be effected by any known means, for example, by the application of compressed air between the tube and the core.

It is found that tubing prepared in accordance with this invention is better in many respects than that formed by known methods and in particular its surface presents a very smooth and attractive appearance.

What we claim is:—

1. A method for manufacturing tubular objects of rubber material which comprises passing a core through a bath of an aqueous dispersion of a rubber compound uniformly depositing thereon dispersed material from said dispersion medium, withdrawing the core and its deposit of rubber material centrally through a circular area of dispersion surface, setting said deposit on said core, and removing it in tubular form from said core.

2. The process of claim 1 in which a concentrated stabilized aqueous dispersion is employed.

In witness whereof, we have hereunto signed our names.

DOUGLAS FRANK TWISS.
EDWARD ARTHUR MURPHY.